UNITED STATES PATENT OFFICE.

STANLEY H. ROOD, OF HARTFORD, CONNECTICUT.

PLASTIC COMPOSITION.

1,322,823.   Specification of Letters Patent.   Patented Nov. 25, 1919.

No Drawing. Application filed May 11, 1918, Serial No. 233,857. Renewed June 12, 1919. Serial No. 303,772.

*To all whom it may concern:*

Be it known that I, STANLEY H. ROOD, a citizen of the United States, residing at Hartford, in the county of Hartford and State of Connecticut, have invented a new and useful Improvement in Plastic Compositions, of which the following is a specification.

This invention relates to a composition of matter which is particularly serviceable for use as material for making gaskets employed for the hermetic sealing of tumblers, jars, cans or bottles, but which may be employed for a variety of other purposes.

The object of the invention is to produce a material especially useful for this purpose having a composition which renders it inert toward all ordinary foods put up in such containers.

This composition has a base of caoutchouc so admixed with other materials as to form a compound suitable for use in what may be termed a raw, that is, an unvulcanized or partially vulcanized state.

The composition is composed of the following ingredients: crude rubber, preferably in the form known to the trade as "washed and dried"; a wax, as for instance, paraffin or ceresin; a non-drying oil, either mineral, such as petrolatum, or vegetable, such as castor oil; and an inert filler such as infusorial earth, talc, barytes, or kaolin; and if desired an inert coloring material, such as red iron oxid or carbon black. These ingredients may be combined in about the following proportions, by weight: crude rubber, 15 parts; wax, 20 parts; non-drying oil, 5 parts; inert filler, 55 parts; inert coloring matter, 5 parts. The above proportions are not the only ones suitable for a mixture for the purpose specified, but a compound composed of the parts as above stated has proved satisfactory in meeting the requirements of an effective and economical hermetic closure.

In making this composition the preferred procedure is to first melt the paraffin in a suitable vessel, such as a steam jacketed mixing-kettle of sufficient capacity to allow for the subsequent adding of the petrolatum and its thorough incorporation with the molten paraffin. When the blending is complete the mass is poured out and allowed to cool, the hardness of the resulting mixture being dependent upon the relative proportions of the two ingredients. The function of the paraffin is to make the gasket less liable to adhere to the surface of the container which is sealed, while the oil lessens the hardness of the compound and renders it less susceptible to wide changes in temperature. The paraffin-petrolatum mixture, crude rubber, filler and coloring matter are then compounded and blended by mixing rolls or by other well known means according to the usual procedure in the art of rubber manufacture so as to obtain a uniform and intimate mixture. This material can then be run through an extrusion machine, or otherwise manipulated into gasket form.

The invention claimed is;

1. The herein-described composition of matter consisting of caoutchouc, wax, non-drying oil, inert filler, and coloring matter.

2. The herein-described composition of matter consisting of caoutchouc, paraffin, non-drying oil, inert filler, and coloring matter, in about the proportions named.

3. The herein-described composition of matter consisting of caoutchouc, paraffin, petrolatum, inert filler, and coloring matter, in about the proportions named.

4. The herein-described composition of matter consisting of caoutchouc, paraffin, petrolatum, infusorial earth, and coloring matter, in about the proportions named.

5. The herein-described composition of matter consisting of caoutchouc, paraffin, petrolatum, infusorial earth, and red oxid of iron, in about the proportions named.

6. The herein described composition of matter consisting of caoutchouc, wax, non-drying oil and inert filler.

STANLEY H. ROOD.